United States Patent [19]
Visinka

[11] Patent Number: 5,747,963
[45] Date of Patent: May 5, 1998

[54] METHOD FOR CONTROLLING AN ELECTRIC MOTOR AND ELECTRIC APPARATUS

[75] Inventor: Radim Visinka, Olesnice, Czechoslovakia

[73] Assignee: Motorola, Inc., Schaumburg, Ill.

[21] Appl. No.: 718,034

[22] Filed: Sep. 23, 1996

[51] Int. Cl.$^6$ .................................................. H02P 5/28
[52] U.S. Cl. ..................... 318/807; 318/749; 318/800; 318/801; 318/609; 318/610
[58] Field of Search ................................ 318/799, 800, 318/801, 802, 803, 806, 807, 804, 805, 808, 809, 810, 811, 812, 813, 814, 815, 609, 610

[56] References Cited

U.S. PATENT DOCUMENTS 3,671,831  6/1972  Chausse et al. ...................... 318/227
4,625,834  12/1986  Tanahashi ............................ 187/29 R

*Primary Examiner*—William M. Shoop, Jr.
*Assistant Examiner*—Kim Lockett
*Attorney, Agent, or Firm*—Robert M. Handy; Robert F. Hightower

[57] ABSTRACT

In a method for controlling an electric motor the stator voltage frequency of the motor is determined by adding the optimal slip frequency of the motor and the desired rotational frequency of the rotor. The magnitude of the stator voltage is determined by subtracting the actual rotational frequency and the desired rotational frequency of the rotor. The desired stator frequency and magnitude are inputted into a pulse width modulation unit which controls an inverter to supply the appropriate voltages to the motor. The operation of the motor with optimal slip has the advantage that the efficiency is optimal independent of the load.

10 Claims, 2 Drawing Sheets

METHOD FOR CONTROLLING AN ELECTRIC MOTOR AND ELECTRIC APPARATUS

FIELD OF THE INVENTION

This invention relates generally to the field of motor control, and more particularly to methods for controlling electric motors, especially alternating current motors, as well as to electric apparatus having such a motor.

BACKGROUND OF THE IVENTION

A conventional technique to control a variable speed alternating current induction motor is to use the voltage-frequency characteristic of the motor. In this conventional technique a diagram of the type shown in FIG. 1 is used. In this diagram the abscissa shows the frequency $f_{ST}$ of the stator of the electric motor and the ordinate shows the voltage V of the voltage applied to the stator windings of the electric motor. The frequency-voltage curve 1 shown in FIG. 1 is only valid for a nominal load of the electric motor. Such a diagram usually is provided by the manufacturer of the electric motor. It can either be obtained by measuring the characteristic or—approximately—by calculation. The so called base point B of the frequency-voltage curve 1 determines the optimal condition for operating the electric motor at nominal load for various speeds of the motor.

With reference to FIG. 2 it is explained in greater detail how this frequency-voltage curve 1 shown in FIG. 1 is used for motor control in the prior art.

FIG. 2 shows an alternating current induction motor 20 having a stator 21 and a rotor 22. The motor 20 is controlled by a micro controller 24.

The windings of thÊ stator 21 are connected to inverter 26 which is coupled to a direct current power supply voltage U. The micro controller 24 is coupled via six lines 32 to the inverter 26. The six lines 32 comprise three pairs of two lines. Each pair of lines is assigned to one of the three phase voltages of the motor 20 which are represented in FIG. 2 by the three power supply lines 27, 29 and 31. Via each pair of lines 32 one of the phase voltages is controlled by applying the appropriate switching signals to the inverter 26. These switching signals are generated by pulse width modulation unit 33 which belongs to the micro controller 24.

The micro controller 24 receives an input signal via its line 34 which is representative of a desired rotational frequency $f_{des}$ of the rotor 22. Via the input line 36 the micro controller 24 receives a speed signal which is representative of the actual rotational frequency of the rotor 22. This signal is provided by a tacho generator 38 coupled to the motor 20 and to the input line 36.

The input lines 34 and 36 are connected to a circuit 40 which subtracts the input signals $f_{des}$ and the speed signal.

The output of the circuit 40 is coupled to a filter 42 which usually is a proportional-integral or proportional-integral-differential filter. This serves to smoothen the impulse response of the motor control system.

The output of filter 42 is coupled via lines 43 and 44 to functional circuitry 45 and the pulse width modulation unit 33, respectively. The functional circuitry 45 can be implemented by any kind of logic or analogue circuitry. The signal delivered by the filter 42 is representative of the desired stator frequency $f_{ST}$ and is used in the pulse width modulation unit 33 to generate the appropriate sequence of switching signals with the right frequency so that the resulting phase voltages which are present on the power supply lines 27, 29, 31 each carry phase voltages for the stator windings of motor 20 having the desired stator frequency $f_{ST}$.

The functional circuitry 45 is needed to determine the required magnitude of the phase voltages. The magnitude of the phase voltages is determined by reference to the diagram shown in FIG. 1. Typically such a diagram is stored in the functional circuitry 45 by means of a look up table. This way the required stator voltage or phase voltage V which corresponds to the desired stator frequency $f_{ST}$ is determined.

The desired stator voltage $V_{ST}$ is transmitted via line 46 to the pulse width modulation unit 33. Within the pulse width modulation unit 33 the duty cycle for control of the inverter 26 is determined which corresponds to the desired stator voltage $V_{ST}$ to be generated for the power supply lines 27, 29 and 31.

This prior art technique for motor control is disadvantageous in that a fixed frequency voltage curve of the type shown in FIG. 1 is used which is optimal only for nominal load. When the load is not nominal this results in a lesser motor efficiency: if the motor is overloaded the slip of the motor is higher which results in higher losses. On the other hand, if the load is less than the nominal load, the motor is over excited which means that the slip is low but the stator currents are high so that losses are also high. A need therefore exists for an improved motor control method and apparatus.

It is therefore an underlying problem of the invention to provide an improved method for controlling an electric motor and an improved electric apparatus comprising such a motor.

SUMMARY OF THE INVENTION

The problem of the invention is solved basically by applying the features laid down in the independent claims. Further preferred embodiments of the invention are given in the dependent claims.

The invention is particularly advantageous in that it allows to provide motor control with high efficiency not only for a nominal load but for a wide range of different loads. Preferably this is accomplished by controlling the motor so that the motor operates at its optimal slip frequency irrespective of the load. This results in an optimal efficiency of the electric motor over a wide load range since the optimal slip frequency is a constant motor characteristic which is neither dependent on the frequency applied to the stator windings nor on the actual load.

It is advantageous to incorporate an electric motor having control circuitry according to the control method of the invention into an electric apparatus since the overall efficiency of the electric apparatus is enhanced due to superior motor performance. As a motor controller according to the invention can be realized at low cost one particular field of usage of the invention is in high volume consumer products, such as dish washers, washing machines or power steering for automobiles.

BRIEF DESCRIPTION OF THE DRAWING

FIG. 3 shows a typical slip-efficiency curve 2 of an electric motor. The abscissa of the diagram of FIG. 3 shows the slip s which is the frequency difference between the motor voltage frequency which is present in the stator windings and the rotational frequency of the rotor. The efficiency E is shown on the abscissa of the diagram shown in FIG. 3. The efficiency E indicates the percentage of the electrical energy supplied to the motor which is transformed into mechanical movement of the rotor. When the motor is operated at its optimal slip frequency $S_{opt}$ the efficiency E reaches its maximum value $E_{MAX}$.

With reference to FIG. 4 now it is explained in greater detail with respect to one embodiment of the invention how an electric motor can be controlled in accordance with the invention so that it is operated at its optimal slip frequency over a wide load range.

FIG. 4 shows an electric apparatus 55 which has an electric motor 20. In the following the same reference numerals will be used for like elements shown in the FIG. 2 and FIG. 4.

Figure 2:
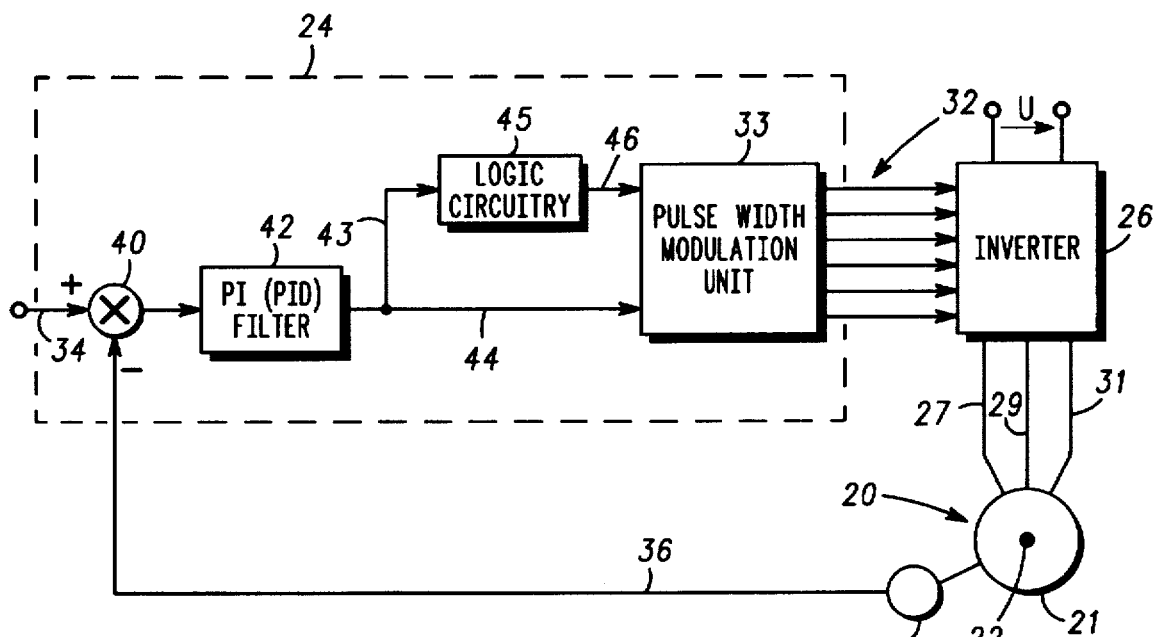
FIG. 2 is a block diagram of a prior art motor control system.
Figure 3:
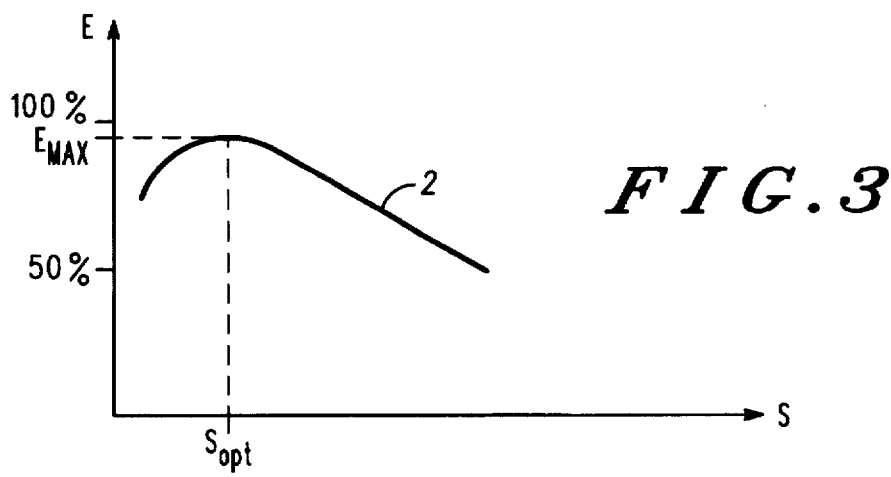
FIG. 3 is a diagram illustrating the interdependence between motor slip and motor efficiency.

The electric motor 20 receives its power supply from the inverter 26 which is controlled by the pulse width modulation unit 33 like explained with reference to FIG. 2.

Further the electric apparatus 55 comprises a micro controller 50. The micro controller 50 receives an input signal which is representative of a desired rotational frequency of the rotor 22 of the motor 20 via the line 34. Also the micro controller 50 receives a signal which is representative of the actual rotational frequency of the rotor 22. Again, this signal is generated by the tacho generator 38 and subtracted from the input signal received via input line 34 by the circuit 40. Like in the prior art the resulting differential signal which is outputted by the circuit 40 is filtered by a filter 42. The resulting signal is representative of the magnitude of the desired stator voltage $V_{ST}$.

Figure 1:
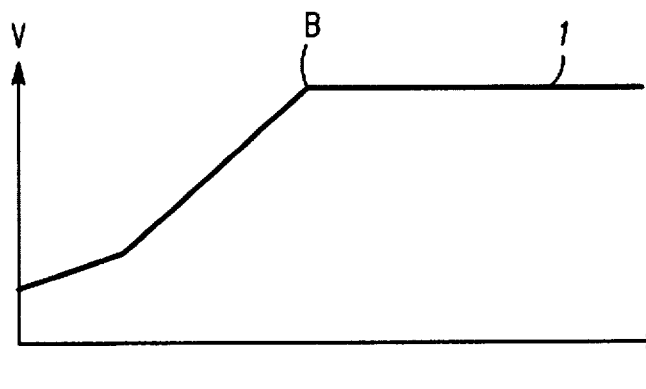
FIG. 1 shows a diagram illustrating a frequency-voltage curve of an electric motor.

No frequency-voltage curve of the type shown in FIG. 1 is used to generate a signal which is representative of the desired stator frequency $f_{ST}$. Instead a circuit 41 is used to add the signal which is present on input line 34 to a signal which is delivered by memory 52 and which is representative of the optimal slip frequency $S_{opt}$ of the electric motor 20. Generally, the optimal slip frequency of a motor depends on the type of the motor and is a given value determined by the design of the motor. One example of a slip frequency is four Herz.

The memory 52 can be any type of memory component which can store the value of the optimal slip frequency $S_{opt}$.

The result of the addition of the optimal slip frequency $S_{opt}$ and the desired rotational frequency of the rotor 22 is a signal which is representative of the desired stator frequency of the stator windings of stator 21 for optimal operation of motor 20. This signal is supplied via line 56 to the pulse width modulation unit 33. Based on this input the pulse width modulation unit 33 and determines the switching frequency for controlling the inverter 26. As a result the stator frequency of the motor 20 is the desired rotational frequency of the rotor 22 plus the optimal slip frequency $S_{opt}$.

This has the advantage that the optimal slip frequency $S_{opt}$ is always added to the desired rotational frequency of the rotor 22 irrespective of the load condition so that the motor 20 is controlled to operate with optimal slip—or with other words—with optimal efficiency irrespective of the load.

In addition the micro controller 50 can comprise a functional block 59. The functional block filters the input signal on line 34 to improve the transitional behavior of the system. This can be desirable when a step transition occurs to allow the motor to decelerate or accelerate smoothly.

One example for an appropriate filter implemented in functional block 59 is a ramp function: When a certain input value is applied to the functional block 59, the output of block 59 reaches the value of the input value only after a certain time delay.

Figure 4:
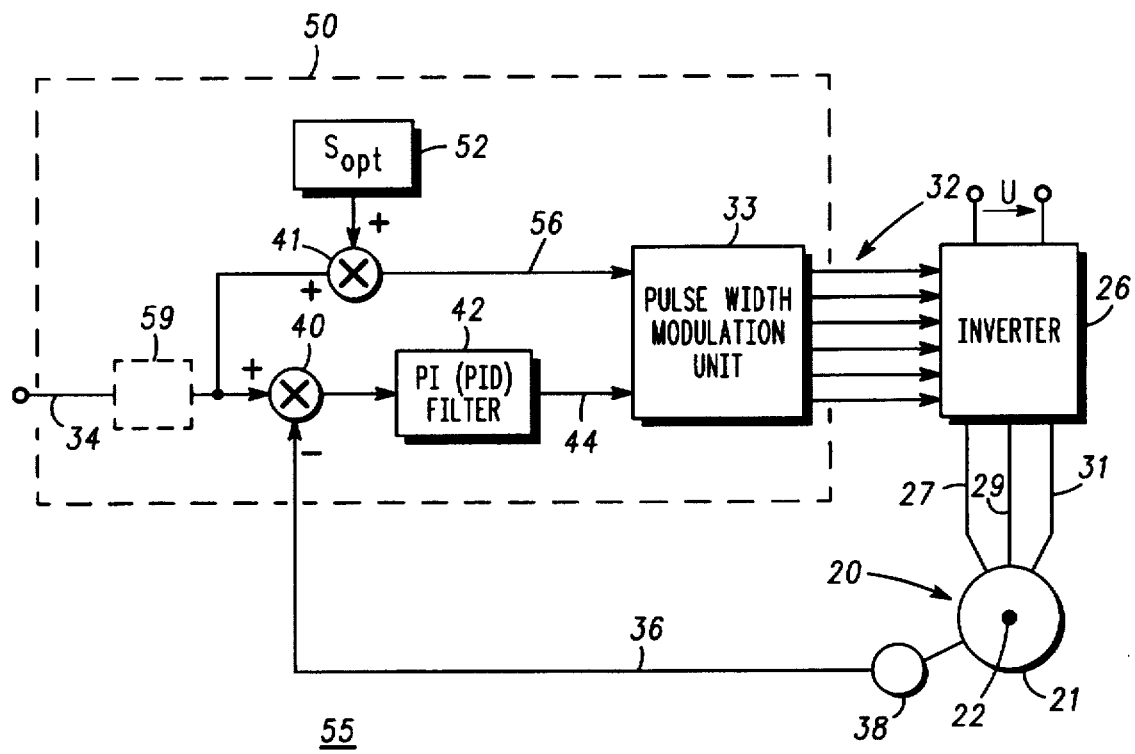
FIG. 4 is a block diagram showing a preferred embodiment of an electric apparatus of the invention.
Figure 5:
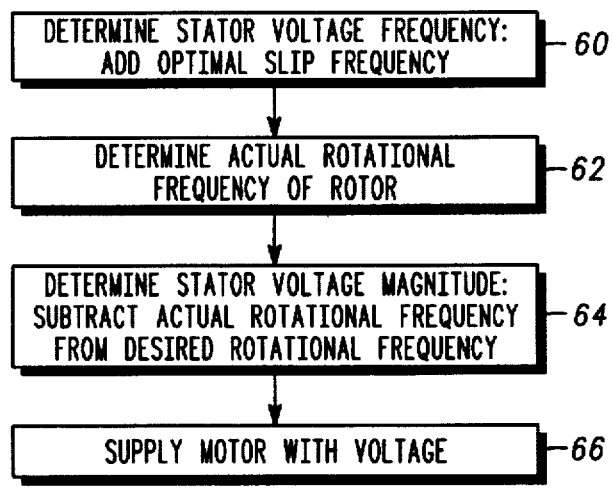
FIG. 5 is a flow chart for illustrating an embodiment of the method of the invention.

FIG. 5 illustrates one embodiment of a method according to the invention. In step 60 the desired stator voltage frequency is determined by adding the optimal slip frequency $S_{opt}$ of the electric motor to an input value which is representative of the desired rotational frequency of the rotor. With respect to the embodiment shown in FIG. 4, this is carried out by the circuit 41 which adds the input signal which is present on input line 34 and a signal from memory 52 which is representative of the optimal slip frequency $S_{por}$.

In step 62 the actual rotational frequency of the rotor is determined.

Again with reference to FIG. 4 this can be accomplished by measuring the rotational frequency by a tacho generator 38. It is also possible to use other measurement techniques or to derive the rotational frequency from other electrical or physical characteristics of the motor which can be measured.

In step 64 the magnitude—or with other words—the amplitude of the stator voltage is determined by means of a stator voltage control parameter. The stator voltage control parameter is determined by subtracting the actual rotational frequency of the rotor from the desired rotational frequency. The resulting differential signal which is representative of the stator voltage control parameter can be filtered to determine the stator voltage magnitude. Appropriate filters are proportional-integral or proportional-integral-differential filters.

With reference again to FIG. 4 the stator voltage control parameter is determined by circuit 40 and the resulting stator voltage magnitude is determined by filtering the output signal of circuit 40 by filter 42.

In step 66 the electric motor is supplied with a stator voltage having the desired stator voltage frequency as determined in step 60 and the desired stator voltage magnitude as determined in step 64.

I claim:

1. A method for controlling an electric motor having a rotor and a stator, said method comprising the steps of determining an excitation frequency by adding a predetermined optimal slip frequency of said electric motor to a desired rotational frequency of said rotor and supplying said motor with a signal having said excitation frequency.

2. The method according to claim 1, further comprising determining an actual rotational frequency of said rotor, determining a signal magnitude by means of a signal control parameter, said signal control parameter being determined by subtracting said actual rotational frequency from said desired rotational frequency, and wherein the step of supplying said motor with said signal includes supplying a signal having said signal magnitude.

3. The method according to claim 1, wherein said signal is a voltage signal.

4. The method according to claim 1, said step of supplying said stator with a signal comprising controlling a pulse width modulation unit of said electric motor in accordance with said excitation frequency and said signal control parameter.

5. An electric apparatus comprising an electric motor and motor control means, wherein said motor has a stator and a rotor, said motor control means comprising:

a) means for determining an excitation frequency by adding a predetermined optimal slip frequency of said electric motor to a desired rotational frequency of said rotor; and b) means for supplying said stator with a signal based on said excitation frequency.

6. The electric apparatus of claim 5, further comprising means for determining an actual rotational frequency of said rotor, means for determining a signal magnitude by means of a signal control parameter, said signal control parameter being determined by subtracting said actual rotational frequency from said desired rotational frequency, and wherein said means for supplying said stator with said signal includes having said signal based on said signal magnitude.

7. The electric apparatus of claim 6, further comprising means for filtering said signal control parameter by proportional-integral or proportional-integral-differential filtering and wherein said signal is a voltage signal.

8. The electric apparatus of claim 6, wherein said means for supplying said stator with said signal further comprising means for controlling a pulse width modulation unit of said motor control means in accordance with said excitation frequency and said signal magnitude.

9. An electric motor having a rotor and comprising:

a) means for determining a motor excitation frequency by adding a predetermined optimal slip frequency of said electric motor to a desired rotational frequency of said rotor;

b) speed sensor means for determining an actual rotational frequency of said rotor;

c) means coupled to the speed sensor means, for determining a drive voltage magnitude by means of a drive voltage control parameter, said drive voltage control parameter being determined by subtracting said actual rotational frequency from a desired rotational frequency; and d) means for supplying said motor with a drive signal having said excitation frequency and based on said drive voltage magnitude.

10. The electric motor of claim 9, further comprising proportional-integral or proportional-integral-differential filters for filtering said drive voltage control parameter.

* * * * *